Patented Jan. 3, 1939

2,142,622

UNITED STATES PATENT OFFICE 2,142,622

LOCOMOTIVE OF THE TYPE PARTICULARLY ADAPTED FOR UNDERGROUND HAULAGE PURPOSES

Thomas Watt, Hatfield, Pretoria, Transvaal, Union of South Africa

Application January 5, 1937, Serial No. 119,136
In the Union of South Africa January 8, 1936

9 Claims. (Cl. 105—172)

This invention relates to improvements in locomotives of the type particularly adapted for underground and like haulage purposes.

The object of the invention is to provide a locomotive of the above referred to type which shall be compact, of robust construction and so arranged that easy access to its working parts is made possible. These and other advantages will become apparent from the following description.

According to the invention the chassis of the improved locomotive is of box-form and is split horizontally into upper and lower parts to make provision for assembling the traction wheel axles and their associated parts from above, in contradistinction to known constructions where these parts are assembled from below, and further characterized in that said axles are cushioned between upper and lower pads of resilient material which thereby eliminate the usual spring mounting of these parts.

Further novel features comprise the provision of an intermediate shaft, driven from a motor or motors mounted on the chassis, which shaft is located in parallel and symmetrical relationship with respect to two traction wheel axles, the power transmission means from said shaft to both traction wheel axles being by way of chains or belts and being wholly located within the box-form chassis. The lower portion of the chassis is made dust-tight and in the case of the employment of chain drives, the bottom thereof forms an oil bath sump for lubricant for the chains. In this construction the resilient pads act additionally as sealing means against the ingress of dust and the loss or leakage of lubricant.

It is a feature of the invention that the bearing housings of the intermediate shaft and traction wheel axles are located in slotted openings extending downwardly from the upper edges of the side walls of the lower box-like part of the chassis, and are secured in their respective positions by the upper chassis part which is adapted to be detachably secured to said lower part by bolts or like fastening means. The resilient pads comprise blocks or slabs of rubber interposed between the bottom faces of the axle bearing housings and the lower ends of said slotted openings, and between the top faces of said housings and load supporting members secured to the underside of the upper chassis part and projecting into said slotted openings.

In the preferred construction the lower chassis part of rectangular box-form is of solid welded construction reinforced by internal transverse rolled steel members, while the upper chassis part, adapted to be bolted to angle iron cleats fixed adjacent the top edge of the lower part, comprises two inwardly turned rolled steel channel members.

The power for driving purposes may be obtained from an electrically or compressed air-driven motor or motors mounted on the chassis. The source of power, in the case of an electric motor, may be obtained from a trolley wire or a secondary electric battery mounted on the chassis, while if a compressed air-driven motor is employed the chassis will support a container or containers of compressed air.

To enable the invention to be more clearly understood and carried into practice, reference is now made to the accompanying drawings in which like reference numerals refer to like parts throughout the several views.

In the drawings:—

Figure 1:
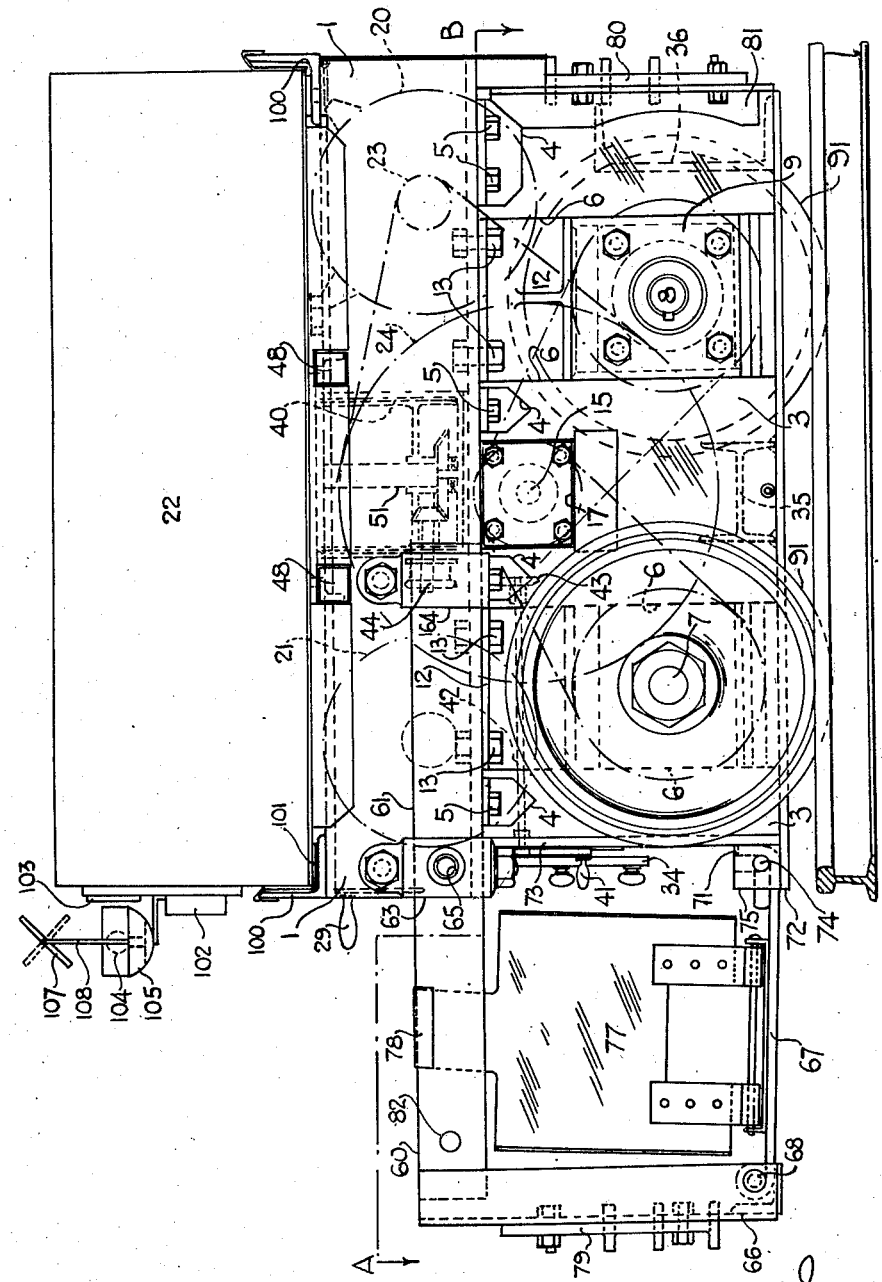
Fig. 1 is a side elevation of a complete locomotive constructed according to the invention but with one nearside traction wheel removed.

Referring to the drawings the upper chassis part composed of two channel sectioned members 1 and 2 is adapted to be bolted to the lower chassis part 3, of welded rectangular box construction, by angle cleats 4 and bolts 5. The side walls of the lower chassis part 3 have slotted openings 6 extending downwardly so as to permit the assembly of traction wheel axles 7 and 8 and their associated parts, from above.

The said axles 7 and 8 are journalled in roller bearings the housings 9 of which are slidably positioned in the said slotted openings 6. Interposed between their bottom faces and the bottoms of said openings 6 are rubber cushion pads 10, while additional resilient pads 11 are interposed between their top faces and load supporting members 12 bolted to the underside of the channel members 1 and 2 by bolts 13. Wearing and guiding strips 14 are welded to the edges of the openings 6 and co-act with slots in the housings 9 as clearly shown in Fig. 2. In the construction illustrated the bottom of the chassis part 3 forms a lubricant sump and the lower pads 10 act as sealing means to exclude dust and prevent escape of lubricant. As additional means to exclude dust and to prevent the escape of lubricant, substantially cup-shaped sealing washers 90 threaded over the axles 7 are located by the bosses of traction wheels 91 (see Fig. 3) so that their inwardly directed peripheries bear against spherical faces 92 formed in the housing cover plates 93. This spherical face 92 is made co-centric with the spherical face of the outer race 94 of the self-aligning bearing 95 so that any relative movement of the bearing does not affect the sealing contact between the washer 90 and the face 92.

Figure 2:
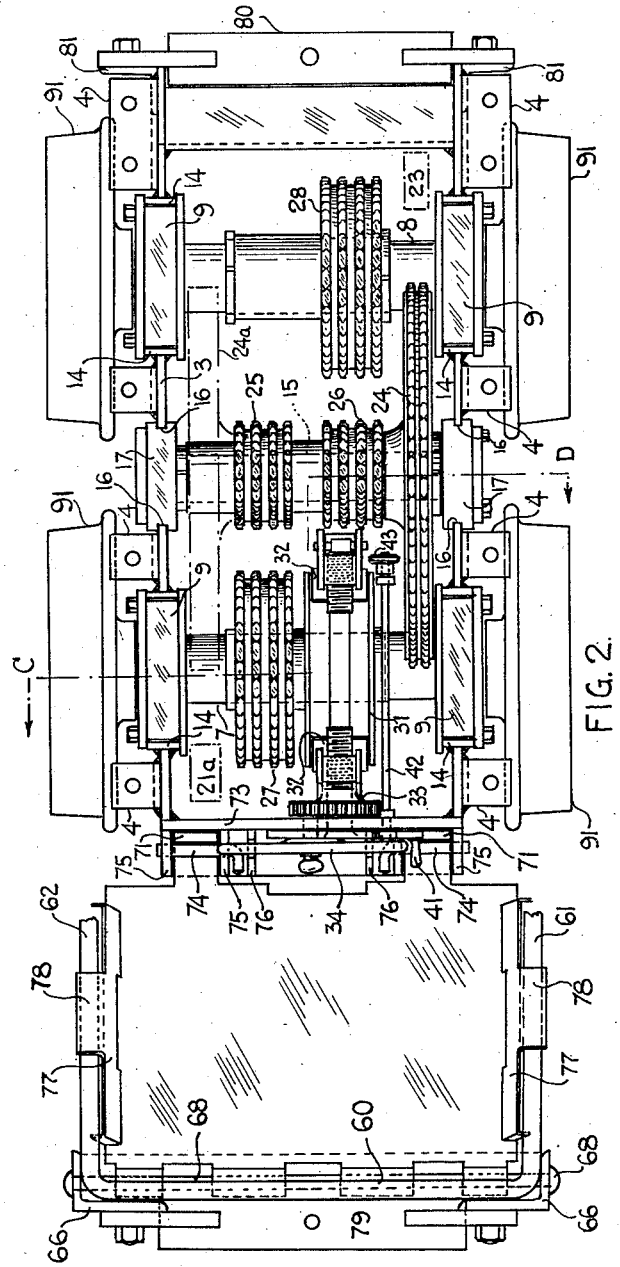
Fig. 2 is a plan view with upper chassis part removed taken on line A—B in Fig. 1.
Figure 3:
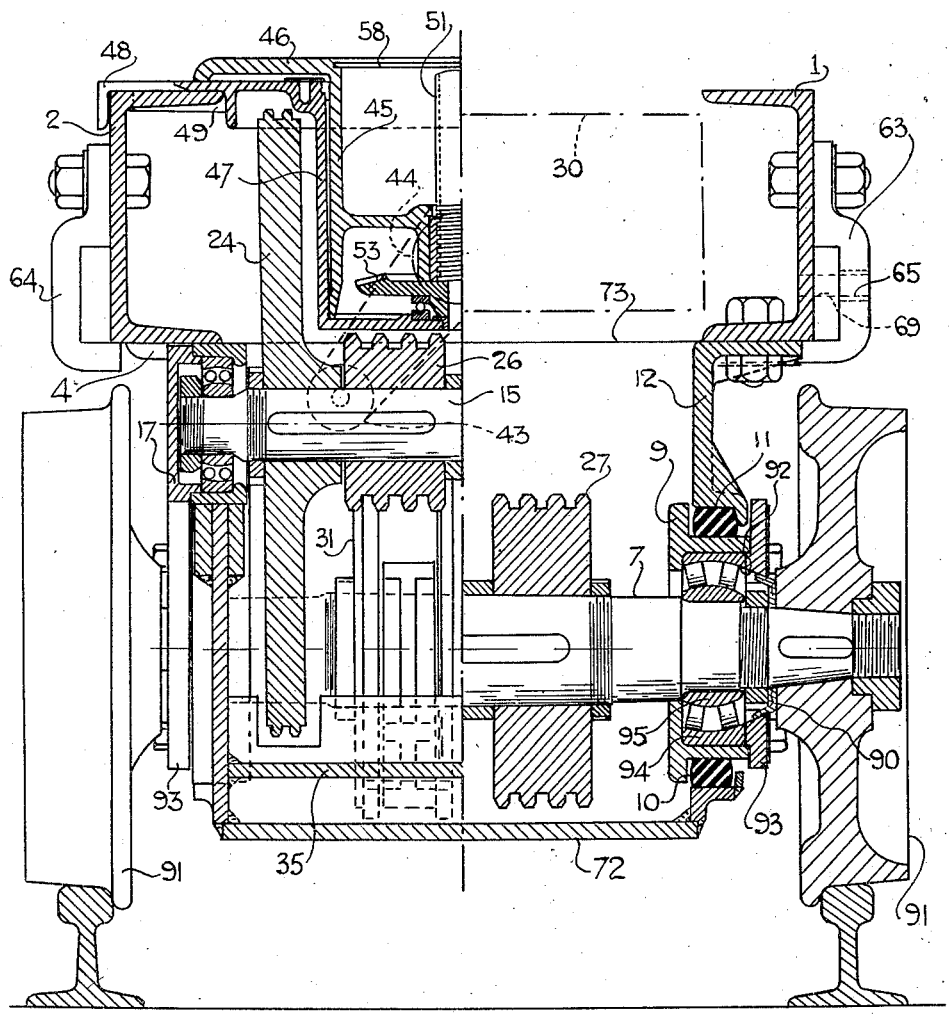
Fig. 3 is a sectional end elevation of the complete locomotive as shown in Fig. 1 taken substantially on a line C—D as shown in Fig. 2.

The intermediate shaft 15 located in parallel and symmetrical relationship with respect to the axles 7 and 8, is likewise located in slotted openings 16 into which its ball-bearing housings 17 are adapted to slide as shown in Fig. 2. The tops of the housings 17 are arranged to be flush with the top edges of the side walls of the chassis part 3 so that the channel members 1 and 2 when bolted on, secure these parts in position.

The locomotive as shown is arranged to be driven by one or a pair of electric motors 20 and 21, shown in chain dotted outline in Fig. 1, which derive current from a battery 22 carried on the chassis. In the case of the use of a single motor 20, the drive by chain is from the motor sprocket 23 to the large chain wheel 24 keyed to the intermediate shaft 15. From this shaft two chain drives transmit power from the small chain wheels 25 and 26 to the larger chain wheels 27 and 28 respectively, keyed to the axles 7 and 8. In this construction a controller 30 operated by the handle 29 is located in the rear portion of the upper chassis part as shown in chain dotted outline in Fig. 3. When an additional motor 21 is employed, a second large chain wheel 24a (shown in dotted outline in Fig. 2) is keyed to the intermediate shaft 15 and the additional drive is taken from the motor sprocket 21a. In this case the controller 30 will be mounted in the driver's cab or in any other convenient position on the chassis. The two axles 7 and 8 are made identical so that they and their associated parts may be interchanged at will. The rear axle 7 has keyed to it a brake drum 31 with which brake shoes 32 coact through brake operating gear 33 by means of the hand-wheel 34.

The lower chassis part 3 is strengthened by the transverse I-section beam 35 and by the large R. S. channel 36, both of which are welded to the vertical side walls. The angled iron cleats 4 are likewise welded to these side walls.

As shown in Fig. 1 the driver's cab is supported by the top U-shaped draught bar 60 the parallel limbs 61 and 62 of which are slidably insertable in the bracket members 63, 64 bolted to the upper chassis part. The two rearmost bracket members 63, are provided with bushed holes 65, for the insertion of locking pins the ends of which engage in corresponding holes 69 in the limbs 61, 62. Depending from the rear end of the draught bar 60 are angle members 66 which support the hinged end of the floor plate 67 pivotally secured by the hinge pin 68. The front or free end of said floor plate 67 is bent upwardly to form lugs 71 which rest upon an extension of the bottom plate 72 of the chassis part 3 and bear against the end plate 73 thereof. The said lugs are detachably secured by sliding bolts 74 located by welded-on holed bracket pieces 75. Similar slotted bracket pieces 76 placed adjacent the head ends of the bolts 74, are provided to prevent accidental withdrawal of these members. Side cab plates 77 are hinged adjacent the sides of the floor plate 67 and their hooked top ends 78 are adapted to engage with the limbs 61 and 62 as clearly shown in Figs. 1 and 2. The usual bumper 79 is shown bolted to the angles 66. A similar bumper 80 is shown bolted to angles 81 at the front end of the locomotive.

When it is desired to collapse the cab the sliding bolts 74 are withdrawn to release the lugs 71. A slight raising of the floor plate 67 will then release the hooked ends 78 of the side cab plates 77 which are thereafter collapsed inwardly so as to lie one above the other on the floor plate 67. The floor plate is then swung upwardly until it is in a vertical position. The locking pins are now withdrawn and the draught bar 60 is pushed forward until the holes 82 in the limbs thereof coincide with the holes 65 in the brackets 63, when the locking pins are reinserted. To remove the cab altogether the limbs 61 and 62 are simply withdrawn completely from engagement with the bracket members 63, 64.

The battery 22 or like power source is supported on the upper chassis part by cross members 100, and rests on cushioning pads 101 of rubber or the like. The usual instruments including a sangamo meter 102 and switches 103 are fixed to the end of the battery container.

An advantageous result of the improved construction above described is that it enables a locomotive with a very short wheel base to be made, which increases its manoeuverability on the tortuous tracks which, in mining operations, cannot be avoided.

Although in most cases a single battery mounted on the locomotive chassis will be sufficient, in some cases it may be desirable to mount additional batteries on one or more tender chassis each of which will be provided with elevating means to facilitate the interchange of batteries.

What I claim is:

1. In a short wheel-base locomotive of the character described, a frame comprising a lower chassis part of rectangular open-topped box form the side walls of which are provided with vertical slots open at the top, wheeled axles mounted transversely of said lower part, bearings for said axles, said bearings being located in said slots and being insertable and removable from the upper edge of the side walls of the box-like chassis part, load supporting members above the bearings and projecting into said slots, and an upper chassis part secured over and to said lower box-like part and to the load supporting members so that the bearings are pressed towards and retained against the bottom ends of said slots, by said load supporting members.

2. In a short wheel-base locomotive of the character described, a frame comprising a lower chassis part of rectangular open-topped box form the side walls of which are provided with vertical slots open at the top, wheeled axles mounted transversely of said lower part, bearings for said axles, said bearings being located in said slots and being insertable and removable from the upper edge of the side walls of the box-like chassis part, load supporting members above the bearings and projecting into said slots, an upper chassis part secured over and to said lower box-like part and to the load supporting members so that the bearings are pressed towards and retained against the bottom ends of said slots by said load supporting members, and power transmitting mechanism located in said box-like part of the chassis, and including driving connections to said axles, the bottom of said box-like part of the chassis serving as a reservoir for lubricant to lubricate said axle bearings and said driving connections.

3. In a short wheel-base locomotive of the character described, a frame comprising a lower chassis part of rectangular open-topped box form the side walls of which are provided with vertical slots open at the top, wheeled axles mounted transversely of said lower part, bearings for said axles, said bearings being located in said slots and being insertable and removable from the upper edge of the side walls of the box-like chassis part, load supporting members above the bearings and projecting into said slots, and an upper chassis part secured over and to said lower box-like part and to the load supporting members so that the bearings are pressed towards and retained against the bottom ends of said slots by said load supporting members, the slotted parts of said side walls having vertical wearing and guiding strips for said bearings.

4. In a short wheel-base locomotive of the character described, a frame comprising a lower chassis part of rectangular open-topped box form the side walls of which are provided with vertical slots open at the top, wheeled axles mounted transversely of said lower part, bearings for said axles, said bearings being located in said slots and being insertable and removable from the upper edge of the side walls of the box-like chassis part, load supporting members above the bearings and projecting into said slots, an upper chassis part secured over and to said lower box-like part and to the load supporting members so that the bearings are pressed towards and retained against the bottom end of the slots by said load supporting members, and upper and lower resilient pads in said slots interposed between said bearings and the load supporting members and between said bearings and the slot bottoms, said pads also serving to prevent ingress of dust and escape of lubricant from said box-like chassis part.

5. In a short wheel-base locomotive of the character described, a frame comprising a lower chassis part of rectangular open-topped box form the side walls of which are provided with vertical slots open at the top, wheeled axles mounted transversely of said lower part, bearings for said axles, said bearings being located in said slots and being insertable and removable from the upper edge of the side walls of the box-like chassis part, load supporting members above the bearings and projecting into said slots, an upper chassis part secured over and to said lower box-like part and to the load supporting members so that the bearings are pressed towards and retained against the bottom ends of said slots by said load supporting members, and power transmitting mechanism located in said box-like part of the chassis, and including driving connections to said axles, the bottom part of said box-like part of the chassis serving as a reservoir for lubricant to lubricate said axle bearings and said driving connections, upper and lower resilient pads in said slots interposed between said bearings and the load supporting members and between said bearings and the slot bottoms, said pads also serving to prevent ingress of dust and escape of lubricant from said lower box-like chassis part.

6. In a short wheel-base locomotive of the character described, a frame comprising an upper member and a lower member, said lower member being of box-like form and having vertical slots open at the top in the side walls of the "box", wheeled axles passing through the slots, axle bearings held in said slots and insertable and removable from the top of the slots, resilient cushions in said slots below and above said bearings, load supporting members filling said slots above the bearings and the upper cushions, said upper frame member resting on and secured to the lower frame member.

7. In a short wheel-base locomotive of the character described, a frame comprising an upper member and a lower member, said lower member being of box-like form and having vertical slots open at the top in the side walls of the "box", wheeled axles passing through the slots, axle bearings held in said slots and insertable and removable from the top of the slots, resilient cushions in said slots below and above said bearings, load supporting members filling said slots above the bearings and the upper cushions, said upper frame member resting on and secured to the lower frame member, said upper frame member comprising longitudinal side beams cross connected together at their ends.

8. In a short wheel-base locomotive of the character described, a frame comprising a lower chassis part of rectangular open-topped box form the side walls of which are provided with vertical slots open at the top, wheeled axles mounted transversely of said lower part, bearings for said axles, said bearings being located in said slots and being insertable and removable from the upper edge of the side walls of the box-like chassis part, load supporting members above the bearings and projecting into said slots, an upper chassis part secured over and to said lower box-like part and to the load supporting members so that the bearings are pressed towards and retained against the bottom ends of said slots by said load supporting members, said bearings being of the self-aligning type carried in housings arranged to fit said vertical slots, and substantially cup-shaped sealing washers threaded over the axles and located by the traction wheel bosses so that their inwardly directed peripheries bear against spherical faces formed in the housing cover plates, which faces are concentric with the spherical faces of the outer races of the self-aligning bearings.

9. In a short wheel-base locomotive of the type described and as claimed in claim 1, characterized in that said lower chassis part is of solid welded construction reinforced by transverse rolled steel members, while the upper chassis part adapted to be bolted to angle iron cleats fixed adjacent the top edge of the lower chassis part, comprises two longitudinal members of rolled steel channel section.

THOMAS WATT.